United States Patent [19]

D'Silva

[11] 4,242,134

[45] Dec. 30, 1980

[54] CADMIUM-FREE SILVER BASED BRAZING ALLOY

[75] Inventor: Thomas L. D'Silva, Beaverton, Oreg.

[73] Assignee: GTE Products Corporation, Stamford, Conn.

[21] Appl. No.: 52,058

[22] Filed: Jun. 25, 1979

[51] Int. Cl.³ .............................................. C22C 5/00
[52] U.S. Cl. ................................ 75/173 C; 75/134 C; 75/134 G
[58] Field of Search ............... 75/134 C, 134 G, 173 C

[56] References Cited

U.S. PATENT DOCUMENTS

| | | | |
|---|---|---|---|
| 3,862,838 | 1/1975 | Sloboda | 75/134 C |
| 4,124,380 | 11/1978 | Youdelis | 75/173 C |

FOREIGN PATENT DOCUMENTS

| | | | |
|---|---|---|---|
| 681890 | 10/1939 | Fed. Rep. of Germany | 75/173 C |
| 415117 | 10/1974 | U.S.S.R. | 75/173 C |

Primary Examiner—L. Dewayne Rutledge
Assistant Examiner—Upendra Roy
Attorney, Agent, or Firm—John F. Lawler

[57] ABSTRACT

A silver based brazing alloy having a composition in percent by weight of 5 to 15 germanium, 8 to 18 zinc, 5 to 39 copper and the balance silver has a wide melting range and a high degree of fluidity when molten and is especially suited for wide-gap brazing of steel assemblies in food handling equipment where cadmium containing brazing alloys cannot be used because of their toxicity.

3 Claims, No Drawings

CADMIUM-FREE SILVER BASED BRAZING ALLOY

BACKGROUND OF THE INVENTION

This invention relates to an improved cadmium-free silver-copper-zinc based brazing alloy.

The element cadmium is added to the silver-copper-zinc ternary system to depress the melting point and thereby provide low melting brazing alloys for brazing most ferrous and nonferrous metals. These alloys are well described in prior art and listed in the BAg series of the American Welding Society (AWS) classification. The cadmium containing alloys are in the lower temperature brazing range of the BAg series. These cannot be used in food handling equipment because of the toxic nature of cadmium. The only low temperature cadmium-free brazing alloy in the AWS classification is an alloy in the silver-copper-zinc-tin system where tin has been added to the Ag-Cu-Zn system to depress the melting point. The Ag-Cu-Zn-Sn system is also described in U.S. Pat. No. 3,862,838. In addition, U.S. Pat. No. 4,052,531 describes an indium containing silver-copper-zinc brazing alloy which has a brazing temperature range comparable to that of the cadmium containing silver brazing alloys.

The tin containing silver-copper-zinc brazing alloy in the AWS classification and the indium containing alloy described in U.S. Pat. No. 4,052,531 both have narrow melting ranges and are suitable replacements for BAg1 and BAg1a alloys in the AWS classification. The Bag2 and BAg2a alloys in the AWS classification have wider melting ranges suitable for brazing joints with wide gaps and a high degree of mismatch because the solid portion of the molten braze material acts to thicken it and slow its tendency to run out of the wide joint before solidifying. The wider melting range facilitates control of the brazing process. There are no alloys available as a suitable replacement of these two cadmium containing alloys.

The alloy of this invention has a low liquidus temperature and a wide melting range and allows for brazing of joints with wide gaps and a large degree of mismatch and is therefore suitable as a replacement for the cadmium containing BAg2 and BAg2a alloys in the AWS classification.

The alloy of this invention can be used for low temperature brazing of stainless steel used in food handling equipment where cadmium containing alloys cannot be used. Another advantage is that it matches stainless steel in color.

DESCRIPTION OF PREFERRED EMBODIMENTS

The alloy of this invention has a composition in percent by weight of 5 to 15 Ge, 8 to 18 Zn, 5 to 39 Cu and the balance Ag. The element germanium is added to the Ag-Cu-Zn system to depress the melting point so as to provide a brazing alloy classification. Also, the element germanium has a low surface tension when molten, the surface tension being comparable in magnitude to tin and indium as described in an article entitled, "The Significance of Wetting in Reactor Technology" by J. W. Taylor, Journal of Nuclear Energy, Vol. 2, pages 5 to 30, 1955. Addition of the element germanium reduces the surface tension of the Ag-Cu-Zn system in the liquid state and thereby increases the wetting capability of the brazing alloy.

The invention may also be practiced with alloys having a composition in percent by weight of 8–12 Ge, 9–15 Zn, 15–25 Cu and the balance Ag.

An alloy of compositions, in percent by weight, of 56.5 Ag, 20 Cu, 13.5 Zn and 10 Ge with a solidus temperature of 530° C. and a liquidus temperature of 705° C. was used for testing the brazing characteristics of the Ag-Cu-Zn-Ge system. The brazing alloy was tested on a T-joint of Type 304 stainless steel. A flux paste of the borax-fluoride type was applied to either side of the T-joint. A small quantity of the brazing alloy was placed on one side of the joint over the applied flux. The assembly was then placed in a glowbar furnace at 730° C. in air.

As the T-joint assembly came to temperature, the brazing alloy melted, and when completely molten, it flowed extremely well and formed smooth fillets on either side of the T-joints. A film of molten alloy spread a distance of 0.25 inch up the vertical arm of the T, thus demonstrating the good wetting capability of the brazing alloy. The complete brazing cycle was accomplished in three minutes. On cooling, there was no evidence of unmelted alloy left behind in the preplacement area. The color of the brazed joint matched the color of stainless steel. The main advantage of this alloy is its ability to braze in the low temperature range of the silver brazing alloys.

The alloy can be used in the form of wire, foil and powder or a paste mixture of powdered alloy and flux. It has sufficient ductility to be produced as wire by conventional techniques. The foil and wire are also convertible into preforms for preplacement in the joint assembly. Foil and wire may be made by the well-known rapid-quench melt spinning process described in the article entitled, "Cooling Molten Metal At A Million Or More Degrees Per Second Yields New, Improved Materials" by William K. Kinner, Materials Engineering, January 1979, pages 33–36.

What is claimed is:

1. A quaternary brazing alloy consisting essentially in percent by weight of 5 to 15 germanium, 8 to 18 zinc, of 5 to 39 copper and the balance silver.

2. A quaternary brazing alloy consisting essentially in percent by weight of 8 to 12 germanium, 9 to 15 zinc, 15 to 25 copper and the balance silver.

3. A quaternary brazing alloy for use in brazing stainless steel food handling equipment consisting in percent by weight of 10 germanium, 13.5 zinc, 20 copper and 56.5 silver.

* * * * *